(12) United States Patent
Klagge et al.

(10) Patent No.: US 8,142,681 B2
(45) Date of Patent: Mar. 27, 2012

(54) AQUEOUS SURFACTANT COMPOSITIONS WITH A LOW POUR POINT

(75) Inventors: Ronald Klagge, Erkrath (DE); Markus Scherer, Köln (DE); Thomas Schliwka, Bergisch-Gladbach (DE); Katharina Hömberg, Hilden (DE); Uwe Held, Velbert (DE); Thomas Mausberg, Haan (DE)

(73) Assignee: Cognis IP Management GmbH, Duesseldorf (DE)

( * ) Notice: Subject to any disclaimer, the term of this patent is extended or adjusted under 35 U.S.C. 154(b) by 0 days.

(21) Appl. No.: 12/469,117

(22) Filed: May 20, 2009

(65) Prior Publication Data

US 2009/0289220 A1    Nov. 26, 2009

(30) Foreign Application Priority Data

May 20, 2008    (EP) .................................. 08009228

(51) Int. Cl.
*C09K 3/00* (2006.01)
*C08F 2/22* (2006.01)
(52) U.S. Cl. ...................... 252/182.12; 524/804; 526/72
(58) Field of Classification Search ............... 252/182.12
See application file for complete search history.

(56) References Cited

U.S. PATENT DOCUMENTS

| | | | |
|---|---|---|---|
| 3,752,857 A | | 8/1973 | Milligan |
| 5,449,725 A | * | 9/1995 | Kanluen et al. ............... 526/240 |
| 6,913,928 B2 | * | 7/2005 | Teta et al. ........................ 436/8 |
| 2007/0105982 A1 | * | 5/2007 | Roschmann et al. ......... 523/201 |

FOREIGN PATENT DOCUMENTS

| | | | |
|---|---|---|---|
| CA | 2013920 A1 | * | 10/1990 |
| DE | 19738108 A1 | | 4/1999 |
| EP | 0272574 A2 | | 6/1988 |
| EP | 0391392 A2 | | 10/1990 |
| EP | 0570121 A1 | | 11/1993 |
| WO | 01/29125 A1 | | 4/2001 |

OTHER PUBLICATIONS

"Polyethylene glycol 200 MSDS", accessed from http://www.sciencelab.com/msds.php?msdsId=9926618 on Sep. 8, 2010.*
"Surfactants and Polyalkylene Glycols", BASF leaflet, Jan. 2005.*
Breox Product Range. XP-002500193, Synlubestechnology Jan. 2006.
Fernandez, Ana Marie et al. New Green Surfactants for Emulsion Polymerization. In: Progress in Organic Coatings, Aug. 22, 2005, p. 246-255, ISSN: 0300-9440.

* cited by examiner

*Primary Examiner* — Peter F Godenschwager
(74) *Attorney, Agent, or Firm* — Diehl Servilla LLC

(57) ABSTRACT

Surfactant compositions which comprise (i) 10 to 90% by weight of one or more compounds selected from the group (a) to (e), and (ii) 10 to 90% by weight of water, based on the composition, are disclosed, where the compounds (a) to (e) are defined as follows:

(a) addition products of ethylene oxide and/or propylene oxide with allyl alcohol,
(b) addition products of ethylene oxide and/or propylene oxide with allyl alcohol, terminally capped with C1-20 alkyl,
(c) compounds of the formula $R^1$—O—X—$R^2$, where X is 1 to 40 ethylene oxide and/or propylene oxide units and where $R^1$ and $R^2$ independently are C1-20 alkyl, excluding allyl,
(d) compounds of the formula $R^3$—O—X—H, where X is 1 to 40 ethylene oxide and/or propylene oxide units and where $R^3$ is C1-20 alkyl, excluding allyl,
(e) compounds of the formula H—O—X—H, where X is 1 to 40 ethylene oxide and/or propylene oxide units.

The surfactant compositions are liquid and pourable at 20° C., with a pour point below 0° C., and are useful as emulsifiers in emulsion polymerization.

5 Claims, No Drawings

AQUEOUS SURFACTANT COMPOSITIONS WITH A LOW POUR POINT

CROSS-REFERENCE TO RELATED APPLICATIONS

The present application is related to and claims the priority benefit of European Patent Application No. EP/08009228.1 filed on May 20, 2008 which is incorporated herein by reference in its entirety.

FIELD OF THE INVENTION

The invention relates to surfactant compositions which are pourable and liquid at 20° C., where these compositions have a pour point below 0° C. and where these compositions comprise a content of from 10 to 90% by weight of special surfactants and from 10 to 90% by weight of water.

BACKGROUND OF THE INVENTION

Emulsifiers play a major role for a very wide variety of applications. One attractive field of application for emulsifiers is the so-called emulsion polymerization. Usually, surfactants are used as emulsifiers in this process.

Emulsion polymerization is a specific method of polymerization in which monomers with low solubility in water are emulsified in water with the help of emulsifiers and are polymerized using water-soluble initiators such as potassium peroxodisulfate or redox initiators. Anionic and/or nonionic surfactants are essential constituents in this process. Via micelle formation in the aqueous solution, they ensure the process of emulsion polymerization.

DETAILED DESCRIPTION OF PREFERRED EMBODIMENTS

It was the object of the present invention to provide aqueous surfactant compositions, in particular those which are suitable for use in emulsion polymerization. These aqueous surfactant compositions should be pourable and/or pumpable at 20° C.; in particular, they should have a pour point below 0° C. in order to thereby ensure their pourability and pumpability even at low temperatures, e.g. in winter. The pour point is determined here according to the method ASTM D 97-96a, known to the person skilled in the art. The sample is tested for its pourability in intervals of 3° C. starting at a temperature of 23° C. The lowest temperature at which the sample is visually just still flowable is referred to as the pour point.

The invention provides surfactant compositions which are pourable and liquid at 20° C., where these compositions have a pour point below 0° C. and where these compositions comprise
(i) 10 to 90% by weight of one or more compounds selected from the group (a) to (e), and
(ii) 10 to 90% by weight of water,
wherein % by weight data in each case is based on the total composition, and wherein the compounds (a) to (e) are defined as follows:
(a) addition products of from 1 to 40 mol of ethylene oxide and/or propylene oxide per mole of allyl alcohol,
(b) addition products of from 1 to 40 mol of ethylene oxide and/or propylene oxide per mole of allyl alcohol, where the OH group of these addition products is terminally capped in the sense that it is replaced by a group OR, where R is alkyl having 1 to 20 carbon atoms which may be saturated or unsaturated, straight-chain or branched,
(c) compounds of the formula $R^1$—O—X—$R^2$, where X is a moiety comprising 1 to 40 ethylene oxide and/or propylene oxide units linked together and where $R^1$ and $R^2$, independently are alkyl having 1 to 20 carbon atoms which in each case may be saturated or unsaturated, straight-chain or branched, with the proviso that $R^1$ and $R^2$ are not allyl,
(d) compounds of the formula $R^3$—O—X—H, where X is a moiety comprising 1 to 40 ethylene oxide and/or propylene oxide units linked together and where $R^3$ is alkyl having 1 to 20 carbon atoms which may be saturated or unsaturated, straight-chain or branched, provided that $R^3$ is not allyl,
(e) compounds of the formula H—O—X—H, where X is a moiety comprising 1 to 40 ethylene oxide and/or propylene oxide units linked together.

The surfactant compositions according to the invention preferably comprise a content of from 50 to 80% by weight of the compounds (a) to (e) and 20 to 50% by weight of water. Here, a content of from 60 to 70% by weight of the compounds (a) to (e) and 30 to 40% by weight of water is very particularly preferred.

In one preferred embodiment, the compounds (i) are selected from the compounds (a) and/or (b). The surfactant compositions according to the invention then preferably comprise a content of from 50 to 80% by weight of the compounds (a) and/or (b) and 20 to 50% by weight of water. A content of from 60 to 70% by weight of the compounds (a) and/or (b) and 30 to 40% by weight of water is very particularly preferred.

It is surprising that the surfactant compositions according to the invention, which are surfactant concentrates in the specified preferred supply forms, have such a low pour point. They therefore combine several advantages. First, they are concentrates, which is attractive for transportation. Additionally they are nevertheless easy to handle, which is demonstrated in pourability and pumpability. Finally, the low pour point is a further advantage when working at low temperatures. It is also surprising that the surfactant compositions according to the invention comprising the compounds (a) and/or (b) can be used with excellent results as emulsifiers in emulsion polymerization, if desired also in admixture with one or more compounds selected from the groups (c), (d) and/or (e).

The compounds (a) to (e) each contain a moiety which is composed of 1 to 40 ethylene oxide units (EO) and/or propylene oxide units (PO) linked together. This moiety can either be composed exclusively of EO units or exclusively of PO units. However, it is also possible for it to consist both of EO and of PO units, where the distribution of EO and PO units can be random or block. The synthesis of the compounds (a) to (e) can be accomplished by methods known in the art. In particular, for inserting the EO/PO moiety, the standard techniques of ethoxylation and propoxylation are suitable. These generally take place at elevated temperature and increased pressure in the presence of suitable alkoxylation catalysts. The choice of alkoxylation catalyst here influences the so-called homolog distribution. Thus, in the presence of catalytically effective alkali metal alcoholates such as sodium methylate, a broad homolog distribution is achieved, whereas, for example, in the presence of hydrotalcite as catalyst, a considerably narrowed homolog distribution is achieved (so-called "narrow range" products).

Compounds (a)

Compounds (a) are addition products of from 1 to 40 mol of ethylene oxide and/or propylene oxide per mole onto allyl alcohol.

Compounds (b)

Compounds (b) are addition products of from 1 to 40 mol of ethylene oxide and/or propylene oxide per mole onto allyl alcohol, where the OH group of these addition products is terminally capped in the sense that it is replaced by a group OR, where R is alkyl having 1 to 20 carbon atoms which may be saturated or unsaturated, straight-chain or branched.

Compounds (c)

Compounds (c) are compounds of the formula $R^1$—O—X—$R^2$, where X is a moiety which is composed of 1 to 40 ethylene oxide and/or propylene oxide units linked together and where $R^1$ and $R^2$, independently are alkyl having 1 to 20 carbon atoms which in each case may be saturated or unsaturated, straight-chain or branched, with the proviso that $R^1$ and $R^2$ are not allyl.

Compounds (d)

The compounds (d) are compounds of the formula $R^3$—O—X—H, where X is a moiety which is composed of 1 to 40 ethylene oxide and/or propylene oxide units linked together and where $R^3$ is alkyl having 1 to 20 carbon atoms which may be saturated or unsaturated, straight-chain or branched, with the proviso that $R^3$ is not allyl.

Compounds (e)

The compounds (e) are compounds of the formula H—O—X—H, where X is a moiety which is composed of 1 to 40 ethylene oxide and/or propylene oxide units linked together.

These surfactant concentrates are liquid and pourable over wide temperature ranges. In particular, the surfactant concentrates are liquid and pourable at 20° C. The lower limit of the temperature range at which the surfactant concentrates according to the invention are still flowable and pourable varies with their composition. The surfactant concentrates according to the invention are pourable above their solidification points and preferably at a temperature which is approximately 3° C. above their solidification points. Those surfactant compositions according to the invention which have viscosity values according to Höppler at 20° C. (DIN 53015) in the range from 0.1 to 3 Pas are particularly preferred.

The surfactant compositions according to the invention are generally suitable for use as emulsifiers in the preparation of aqueous lattices, which are understood as meaning aqueous emulsions or dispersions of polymers and/or copolymers and which are usually accessible by the route of emulsion polymerization. The nature of the polymers and copolymers in these aqueous lattices is not subject per se to any particular limitations. However, particular preference is given to polymers and copolymers based on the following monomer building blocks: acrylic acid, acrylic acid ester, butadiene, methacrylic acid, methacrylic acid ester, styrene, vinyl acetate and vinyl versatate. In one preferred embodiment, the surfactants are selected here from the compounds of the classes (a) and (b). In a further preferred embodiment, the surfactants to be used according to the invention are selected exclusively from the compounds of class (a). In a further preferred embodiment, the surfactants to be used according to the invention are selected exclusively from the compounds of class (b).

EXAMPLES

Substances Used:
FA-30EO: addition product of 30 mol of ethylene oxide onto a fatty alcohol (Disponil LS 30, Cognis)
Breox I: ethylene oxide addition product onto allyl alcohol (Breox AA E 450 H, Cognis)
Breox II: ethylene oxide addition product onto allyl alcohol (Breox AA PE 554 H, Cognis)
Disponil A 3065: modified ethoxylated fatty alcohol (Cognis)

Example 1

A surfactant mixture was prepared by mixing the following components: 35.0 g of FA-30EO, 15.0 g of Breox I, 50 g of demineralized water. The active substance content of the mixture was 50%. The pour point of the mixture was −2° C.

Example 2

A surfactant mixture was prepared by mixing the following components: 45.5 g of FA-30EO, 19.5 g of Breox II, 35 g of demineralized water. The active substance content of the mixture was 65%. The pour point of the mixture was −3° C.

Example 3

A surfactant mixture was prepared by mixing the following components: 42.0 g of FA-30EO, 18.0 g of Breox II, 40 g of demineralized water. The active substance content of the mixture was 60%. The pour point of the mixture was −9° C.

What is claimed is:

1. A surfactant composition comprising:
 (i) about 15 to about 20% by weight of one or more compounds selected from the groups (a) and/or (b), wherein (a) and (b) are defined as follows:
  (a) addition products of from 1 to 40 mol of ethylene oxide per mole of allyl alcohol,
  (b) addition products of from 1 to 40 mol of ethylene oxide per mole of allyl alcohol, wherein the OH group of these addition products is terminally capped in the sense that it is replaced by a group OR, where R is alkyl having 1 to 20 carbon atoms which may be saturated or unsaturated, straight-chain or branched;
 (ii) about 35 to about 50% by weight of water, based on the composition; and
 (iii) about 35 to about 46% by weight a compound of the formula $R^1$—O—X—H, where X is a moiety comprising 1 to 40 ethylene oxide units linked together and where $R^1$ is alkyl having 1 to 20 carbon atoms which may be saturated or unsaturated, straight-chain or branched, with the proviso that $R^1$ is not allyl,
 wherein said composition is pourable and liquid at 20° C., with a pour point below 0° C., and wherein said composition is effective as a surfactant for emulsion polymerization.

2. The surfactant composition of claim 1, wherein component (i) is an addition product of from 1 to 40 mol of ethylene oxide per mole of allyl alcohol.

3. The surfactant composition of claim 1, wherein component (iii) is the addition product of ethylene oxide onto a fatty alcohol.

4. A method of polymerizing monomers comprising: providing the surfactant composition of claim 1 and mixing the surfactant composition with one or more monomers during emulsion polymerization.

5. The method of claim 4, wherein the monomer is selected from the group consisting of acrylic acid, acrylic acid ester, butadiene, methacrylic acid, methacrylic acid ester, styrene, vinyl acetate and vinyl versatate.

* * * * *